Aug. 15, 1967     J. H. KRAMER     3,336,021

RUBBER TORSION SPRING

Filed June 11, 1965

INVENTOR.
JAMES H. KRAMER
BY Harold S. Meyer
ATTY.

United States Patent Office 3,336,021
Patented Aug. 15, 1967

3,336,021
RUBBER TORSION SPRING
James H. Kramer, Akron, Ohio, assignor to The B. F. Goodrich Company, New York, N.Y., a corporation of New York
Filed June 11, 1965, Ser. No. 463,091
3 Claims. (Cl. 267—1)

ABSTRACT OF THE DISCLOSURE

Rubber torsion springs with longitudinally split cylindrical shells have the edges of the shells rounded and separated at the split and have the rubber molded to fill the gap.

---

This invention relates to rubber torsion springs of the type composed of a generally cylindrical body of rubber in the space between a shaft and a shell. Such springs are very desirable in many situations, especially where avoidance of lubrication is of especial importance.

In the vulcanization of the rubber of cylindrical torsion springs the rubber takes its approximate final shape at the high temperature required for vulcanization and then contracts on cooling. To prevent tension from being exerted against the internal shaft or external shell, it has been the practice to form the shell in spaced halves as shown in Haushalter Patent No. 1,958,141 with a slot molded into the rubber internally of the shell and then to squeeze the two halves of the shell toward one another in the mounting so as to close the slot partially or completely and eliminate all remaining tension and place the rubber under slight compression. This arrangement has been found to be quite convenient for another reason, in that the slot between the halves of the shell could be used as a keyway to take the torsional force of the spring. In some instances the shell, instead of being formed in halves of semi-cylindrical shape with margins terminating at the slot which separates them, have been formed with extensions of the metal bent outwardly to form flanges, as shown in the Flogaus Patent No. 2,450,506, but in this case too, the practice has been to mold a slot into the rubber.

Experience has shown that when failure of cylindrical rubber torsion springs occurs, it tends to be at the locations of maximum stress, either at the interface between the rubber and the shaft or at the slot between the halves of the external shell. It is possible by a suitable choice of proportions to reach a satisfactory balance between magnitude of stress at the shaft surface and the angular freedom of motion obtainable with a particular torsion spring, but until now, no way was known for eliminating the concentration of stress at the slot between the halves of the external shell.

Careful study of the problem has led to a construction in which stress concentration at the margins of the halves of the shells is essentially eliminated and in which the life of the torsion spring for a given magnitude of load is accordingly greatly extended. This construction involves rounding of the internal longitudinal edges of the halves of the shell and molding of the rubber so that it fills the space between the rounded longitudinal edges.

Contrary to the supposition that complete filling of the space between the edges of the halves of the shell would result in pinching of the rubber, and produce a concentration of stress just as objectionable as that resulting from absence of rubber at this point, it has been established that no such ill effects will occur if the internal corners of the metal are smoothly rounded.

Figure 1:
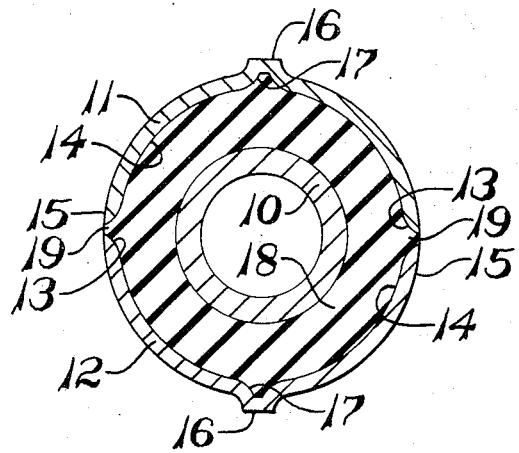
Figure 2:
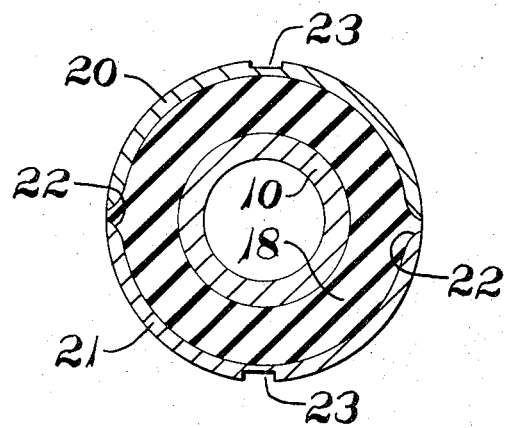
Figure 3:
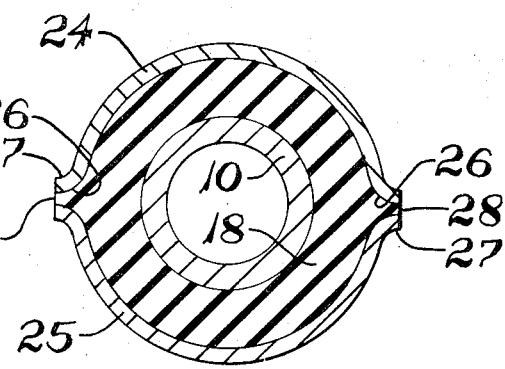

This invention will be described with reference to the accompanying drawings, in which FIGS. 1, 2, and 3 are cross sections of different embodiments of the cylindrical rubber torsion springs of this invention.

Referring to FIG. 1, a cylindrical shaft 10 which, as a matter of convenience, may be hollow, is approximately concentric with two generally semi-cylindrical external shell halves 11 and 12, which may be stampings formed from a suitable thickness of sheet steel. Each of the half shells 11 and 12 has its internal longitudinal edges 13 rounded off to present a smooth curved surface to the rubber extending from the generally cylindrical internal surface 14 of each half shell to the general location of the external surface 15. In addition, a key 16 is formed at a suitable location in each of the half shells 11 and 12 by displacement of the metal externally, either along the entire length of the spring or over such portions of its length as may be desirable in a particular instance. These keys 16 are intended to be received in keyways of the supporting structure for transmittal of the torsional force of the spring to the supporting structure when the shaft 10 is turned. It is desirable to displace the metal in the formation of the keys 16 in such a fashion as to leave smoothly curved internal surfaces 17 for reasons which will be explained below.

Rubber 18, which is the actual spring element, is molded and vulcanized in the usual way in the space between the shaft 10 and the shell halves 11 and 12, preferably with the aid of suitable rubber-to-metal adhesives. The mold used for supporting the components of the rubber torsion spring during the molding and vulcanizing operation should be so shaped as to permit the rubber to fill the entire space between the longitudinal edges of the shell halves 11 and 12 and become bonded firmly to the rounded surfaces 13 of these edges clear out to the generally cylindrical external surface 15. When the assembly is cooled after completion of vulcanization, the contraction of the vulcanized rubber causes a slight depression of the longitudinal surface of the rubber where it is exposed along the gap 19 between the longitudinal edges of the shell halves 11 and 12. When such a spring is properly installed in a supporting structure, it will be radially compressed by the supporting structure to a sufficient extent to eliminate the depression at the gap 19 in the metal shell and instead to cause the rubber at this point to be squeezed slightly beyond the cylindrical outer surface 15 into contact with the supporting structure if the support is continuous at this point.

It has been found that cylindrical rubber torsion springs of the construction just described have no significant concentration of stresses at any point in the body of rubber 18, either at the gap 19 in the metal shell or at the depression 17 where the key 16 is formed. These new torsion springs consequently exhibit a much longer life in service than previous constructions of such cylindrical rubber torsion springs.

In the embodiment of FIG. 2, a shaft 10 and body of rubber 18 are contained within external shell halves 20 and 21, having internally rounded longitudinal edges 22 as described above, but in this case, keyways 23 are formed in the shell halves 20 and 21 to receive keys forming a part of the supporting structure, which is the reverse of the construction shown in FIG. 1 for transmittal of torsional forces.

In the embodiment of FIG. 3, the shaft 10 and rubber 18 are contained in external shell halves 24 and 25. In this case, the longitudinal edges of the shell halves 24 and 25 are bent outwardly for a small distance so as to form smoothly curved internal edges 26 and external flanges 27. In this modification, it is preferable for the rubber 18 to be molded to an original longitudinal surface 28 flush with the ends of the flanges 27. In this modification, the flanges 27 can be received in keyways or other bearing surface for transmittal of the torsional force of the spring.

I claim:
1. A rubber torsion spring of the type in which a generally cylindrical hollow body of rubber is bonded internally to a shaft and externally to a longitudinally split shell, in which the internal edges of the shell at the split are smoothly rounded and in the spring as molded the rounded edges are separated by a narrow space which is filled with the body of rubber and are free to move toward one another except for the restraint imposed by the presence of the rubber.
2. A rubber torsion spring as in claim 1 in which the shell is provided with shoulders which may be keyed to the supporting structure for transmittal of torsional forces.
3. A rubber torsion spring as in claim 2 in which the longitudinal edges of the shell at the split are turned radially outward.

References Cited

UNITED STATES PATENTS

| | | | |
|---|---|---|---|
| 2,188,952 | 2/1940 | Leighton | 267—57.1 |
| 2,251,416 | 8/1941 | Parker | 267—57.1 |
| 2,409,500 | 10/1946 | Krotz | 267—57.1 |

ARTHUR L. LA POINT, *Primary Examiner.*

R. M. WOHLFARTH, *Assistant Examiner.*